(12) United States Patent
Burd (10) Patent No.: US 10,132,498 B2
(45) Date of Patent: Nov. 20, 2018

(54) THERMAL BARRIER COATING OF A COMBUSTOR DILUTION HOLE

(71) Applicant: United Technologies Corporation, Hartford, CT (US)

(72) Inventor: Steven W. Burd, Cheshire, CT (US)

(73) Assignee: United Technologies Corporation, Farmington, CT (US)

( * ) Notice: Subject to any disclaimer, the term of this patent is extended or adjusted under 35 U.S.C. 154(b) by 537 days.

(21) Appl. No.: 14/601,037

(22) Filed: Jan. 20, 2015

(65) Prior Publication Data

US 2016/0209033 A1 Jul. 21, 2016

(51) Int. Cl.
| | |
|---|---|
| F23R 3/04 | (2006.01) |
| F23R 3/00 | (2006.01) |
| F23R 3/06 | (2006.01) |
| F23R 3/50 | (2006.01) |

(52) U.S. Cl.
CPC .............. F23R 3/002 (2013.01); F23R 3/06 (2013.01); F23R 3/50 (2013.01); *F23R 2900/00005* (2013.01); *F23R 2900/00018* (2013.01); *Y02T 50/675* (2013.01)

(58) Field of Classification Search
CPC ........ F05D 2230/90; F23R 3/002; F23R 3/04; F23R 3/045; F23R 2900/00018; F23R 2900/00005; F23R 2900/03045
USPC .......................................................... 60/753
See application file for complete search history.

(56) References Cited

U.S. PATENT DOCUMENTS

| | | | | |
|---|---|---|---|---|
| 3,922,851 | A * | 12/1975 | Irwin ..................... | F23R 3/007 60/39.821 |
| 3,982,392 | A * | 9/1976 | Crow ...................... | F23R 3/007 239/402.5 |
| 4,622,821 | A * | 11/1986 | Madden .................... | F23R 3/06 60/755 |
| 4,813,631 | A | 3/1989 | Gratzer | |
| 5,077,967 | A * | 1/1992 | Widener ................... | F23R 3/04 415/208.1 |
| 5,181,379 | A * | 1/1993 | Wakeman ............... | F02K 1/822 60/753 |
| 5,197,289 | A * | 3/1993 | Glevicky .................. | F23R 3/04 60/746 |
| 5,603,604 | A | 2/1997 | Norris | |
| 5,749,229 | A * | 5/1998 | Abuaf ....................... | F02K 1/82 60/752 |

(Continued)

FOREIGN PATENT DOCUMENTS

| | | |
|---|---|---|
| EP | 2799775 | 11/2014 |
| WO | 2014114988 | 7/2014 |

OTHER PUBLICATIONS

William F. Colban, "Effects of Realistic Combustor Exit Profiles on a Turbine Vane Endwall", Virginia Polytechnic Institute and State University, Blacksburg, Virginia, Jan. 4, 2002.

(Continued)

*Primary Examiner* — Lorne Meade
*Assistant Examiner* — Eric Linderman
(74) *Attorney, Agent, or Firm* — O'Shea Getz P.C.

(57) ABSTRACT

Aspects of the disclosure are directed to a liner associated with a combustor of an aircraft engine, comprising: a thermal barrier coating, and a base metal, wherein the thermal barrier coating comprises a contoured surface on a flowpath side proximate to an exit of a hole formed by the thermal barrier coating and the base metal.

15 Claims, 6 Drawing Sheets

(56) References Cited

U.S. PATENT DOCUMENTS

| | | | | |
|---|---|---|---|---|
| 5,817,372 A * | 10/1998 | Zheng | C23C 4/02 | 427/454 |
| 5,851,679 A * | 12/1998 | Stowell | C23C 28/04 | 359/359 |
| 5,941,686 A * | 8/1999 | Gupta | F01D 5/186 | 415/115 |
| 6,096,381 A * | 8/2000 | Zheng | C23C 4/02 | 427/454 |
| 6,136,453 A * | 10/2000 | Ritter | C23C 4/02 | 427/456 |
| 6,207,295 B1 * | 3/2001 | Stowell | C23C 28/3215 | 428/615 |
| 6,210,488 B1 * | 4/2001 | Bruce | B08B 3/12 | 134/1 |
| 6,242,050 B1 * | 6/2001 | Ritter | C23C 4/18 | 427/376.6 |
| 6,629,415 B2 | 10/2003 | Howard | | |
| 6,668,559 B2 * | 12/2003 | Calvez | F23R 3/007 | 60/753 |
| 6,884,029 B2 | 4/2005 | Beeck | | |
| 6,926,496 B2 * | 8/2005 | Ackermann | F23M 5/00 | 415/191 |
| 6,971,242 B2 * | 12/2005 | Boardman | F23R 3/283 | 60/738 |
| 7,000,397 B2 * | 2/2006 | Pidcock | F23R 3/002 | 60/752 |
| 7,093,439 B2 * | 8/2006 | Pacheco-Tougas | F23R 3/002 | 60/752 |
| 7,216,485 B2 * | 5/2007 | Caldwell | F23R 3/06 | 29/889.721 |
| 7,288,328 B2 * | 10/2007 | Darolia | C23C 30/00 | 416/241 R |
| 7,464,554 B2 * | 12/2008 | Cheung | F23R 3/00 | 60/754 |
| 8,153,923 B2 * | 4/2012 | Beck | F01D 5/186 | 219/121.2 |
| 8,266,914 B2 * | 9/2012 | Hawie | F01D 9/023 | 60/796 |
| 9,216,491 B2 * | 12/2015 | Bunker | B24C 1/045 | |
| 9,327,384 B2 * | 5/2016 | Bunker | | |
| 9,567,664 B2 * | 2/2017 | Bolz | C23C 14/083 | |
| 2001/0048972 A1 * | 12/2001 | Fernihough | C23C 16/045 | 427/250 |
| 2002/0116929 A1 * | 8/2002 | Snyder | F23R 3/002 | 60/740 |
| 2004/0123598 A1 * | 7/2004 | Ackermann | F23M 5/00 | 60/752 |
| 2005/0081527 A1 * | 4/2005 | Howell | F23L 15/04 | 60/748 |
| 2005/0086940 A1 * | 4/2005 | Coughlan, III | F23R 3/002 | 60/752 |
| 2005/0132714 A1 * | 6/2005 | Mayer | F02K 1/822 | 60/796 |
| 2006/0005543 A1 * | 1/2006 | Burd | F23M 5/085 | 60/752 |
| 2006/0016191 A1 * | 1/2006 | Woodcock | C23C 4/18 | 60/754 |
| 2006/0083937 A1 * | 4/2006 | Burd | F01D 5/288 | 428/457 |
| 2006/0093851 A1 * | 5/2006 | Darolia | C23C 30/00 | 428/680 |
| 2007/0113476 A1 * | 5/2007 | Thomas | B01B 1/005 | 48/198.7 |
| 2007/0125093 A1 * | 6/2007 | Burd | F23R 3/04 | 60/804 |
| 2007/0144178 A1 * | 6/2007 | Burd | F23R 3/002 | 60/753 |
| 2007/0207328 A1 * | 9/2007 | Frost | C23C 4/02 | 428/469 |
| 2008/0085395 A1 * | 4/2008 | Fernihough | F01D 5/005 | 428/131 |
| 2008/0134682 A1 * | 6/2008 | Garry | F23R 3/06 | 60/752 |
| 2008/0197120 A1 * | 8/2008 | Beck | B23K 26/0604 | 219/121.71 |
| 2009/0067998 A1 * | 3/2009 | Beck | F01D 5/186 | 415/175 |
| 2009/0142548 A1 * | 6/2009 | Patterson | C23C 4/02 | 428/137 |
| 2010/0015401 A1 * | 1/2010 | Bolz | C23C 14/083 | 428/172 |
| 2010/0077764 A1 * | 4/2010 | Dierberger | F23R 3/002 | 60/754 |
| 2010/0095679 A1 * | 4/2010 | Rudrapatna | F23R 3/005 | 60/752 |
| 2010/0095680 A1 * | 4/2010 | Rudrapatna | F23R 3/002 | 60/754 |
| 2010/0154426 A1 * | 6/2010 | Parker | F23R 3/002 | 60/748 |
| 2010/0162715 A1 * | 7/2010 | Nagaraj | C23C 4/08 | 60/752 |
| 2010/0170259 A1 * | 7/2010 | Huffman | F01D 9/023 | 60/755 |
| 2010/0236256 A1 | 9/2010 | Hussain | | |
| 2011/0005233 A1 * | 1/2011 | Sadig | F23R 3/04 | 60/754 |
| 2011/0126543 A1 * | 6/2011 | Kirsopp | F23R 3/002 | 60/742 |
| 2011/0151219 A1 * | 6/2011 | Nagaraj | F23R 3/007 | 428/215 |
| 2011/0185737 A1 * | 8/2011 | Dierberger | F23M 5/02 | 60/752 |
| 2011/0185740 A1 * | 8/2011 | Dierberger | F23M 5/02 | 60/755 |
| 2012/0017596 A1 * | 1/2012 | Rudrapatna | F23R 3/06 | 60/752 |
| 2012/0034471 A1 * | 2/2012 | Peterson | C23C 4/02 | 428/457 |
| 2012/0102959 A1 * | 5/2012 | Starkweather | F23R 3/04 | 60/752 |
| 2012/0148769 A1 * | 6/2012 | Bunker | B23P 15/04 | 428/34.1 |
| 2012/0276308 A1 * | 11/2012 | Rebak | F01D 5/184 | 428/34.1 |
| 2012/0324894 A1 * | 12/2012 | Dierberger | F23R 3/002 | 60/722 |
| 2013/0000309 A1 * | 1/2013 | Dierberger | F23R 3/002 | 60/752 |
| 2013/0014510 A1 * | 1/2013 | Pater | F01D 5/18 | 60/752 |
| 2013/0020291 A1 * | 1/2013 | Elfizy | B23K 26/388 | 219/121.71 |
| 2013/0025288 A1 * | 1/2013 | Cunha | F23R 3/002 | 60/772 |
| 2013/0078582 A1 * | 3/2013 | Pidcock | F23R 3/50 | 431/12 |
| 2013/0092123 A1 | 4/2013 | Straub | | |
| 2013/0101761 A1 * | 4/2013 | Bunker | F01D 5/288 | 428/34.1 |
| 2013/0209232 A1 * | 8/2013 | Xu | B24C 1/045 | 415/116 |
| 2013/0232980 A1 * | 9/2013 | Chen | F23R 3/045 | 60/754 |
| 2013/0269354 A1 * | 10/2013 | Starkweather | F23R 3/06 | 60/754 |
| 2013/0323079 A1 | 12/2013 | Martin | | |
| 2014/0083115 A1 * | 3/2014 | Von Nieda | G02B 5/0816 | 60/806 |
| 2014/0161585 A1 * | 6/2014 | Arness | F01D 5/186 | 415/1 |
| 2014/0259295 A1 * | 9/2014 | Guglielmo | A43B 23/24 | 2/245 |
| 2015/0128603 A1 * | 5/2015 | Clemen | F23R 3/04 | 60/758 |
| 2016/0069567 A1 * | 3/2016 | Burd | F23R 3/06 | 60/722 |

(56) References Cited

U.S. PATENT DOCUMENTS

| | | | |
|---|---|---|---|
| 2016/0069569 A1* | 3/2016 | Burd | F23R 3/002 60/806 |
| 2016/0178199 A1* | 6/2016 | Burd | F02C 7/18 60/782 |
| 2016/0186998 A1* | 6/2016 | Kostka, Jr. | F23R 3/06 60/782 |
| 2016/0201908 A1* | 7/2016 | Drake | F23R 3/002 60/782 |
| 2016/0238250 A1* | 8/2016 | Moura | F23R 3/005 |
| 2016/0265777 A1* | 9/2016 | Hoke | F23R 3/002 |
| 2016/0273391 A1* | 9/2016 | Burd | F01D 25/30 |
| 2016/0327271 A1* | 11/2016 | Sandoval | F23R 3/045 |
| 2016/0334102 A1* | 11/2016 | Johnson | F23R 3/002 |
| 2016/0370007 A1* | 12/2016 | Hongoh | F23R 3/002 |
| 2016/0377289 A1* | 12/2016 | Kostka, Jr. | F23R 3/06 60/752 |

OTHER PUBLICATIONS

Ross James Gustafson, "Flow and Temperature Measurements in a Linear Turbine Blade Passage With Leading Edge and Endwall Contouring With and Without Film Cooling", Louisiana State University and Agricultural and Mechanical College, May 2005.

W.F. Colban, "Combustor Turbine Interface Studies—Part 1: Endwall Effectiveness Measurements", Journal of Turbomachinery, ASME, vol. 125, pp. 193-202, Apr. 2003.

James William Post, "Aerodynamic and Heat Transfer Studies in a Combustor-Fired, Fixed-Vane Cascade With Film Cooling", Louisiana State University and Agricultural and Mechanical College, May 2009.

M.D. Barringer, "Migration of Combustor Exit Profiles Through High Pressure Turbine Vanes", Journal of Turbomachinery, ASME, vol. 131, Apr. 2009.

S.S. Vakil, "Flow and Thermal Field Measurements in a Combustor Simulator Relevant to a Gas Turbine Aeroengine", Journal of Engineering for Gas Turbines and Power, ASME, vol. 127, Apr. 2005.

Joseph J. Scrittore, "Experimental Study of the Effect of Dilution Jets on Film Cooling Flow in a Gas Turbine Combustor", Virginia Polytechnic Institute and State University, Blacksburg, Virginia, Jun. 27, 2008.

Alan A. Thrift, "Cooling of a Turbine Vane Endwall Through Contouring and Flow Injection", Pennsylvania State University Graduate School College of Engineering, Dec. 2011.

Extended EP Search Report dated Jun. 23, 2016.

* cited by examiner

THERMAL BARRIER COATING OF A COMBUSTOR DILUTION HOLE

BACKGROUND

Gas turbine combustors are typically configured with air feed, dilution and/or trim holes that project through the inner and outer walls of the combustor. These holes provide pressurized feed air to the combustor to support combustion of an internal fuel-air mixture. Other holes provide air flow that is designed to tailor the combustion spatially and temporally within the combustor to benefit emissions, performance or the temperature characteristics at the aft end of the combustor that enters a downstream turbine.

The air that comes out of one or more of the holes described above interacts with the fuel-air mixture in the combustor. This feed air usually enters the combustor with enough momentum to act like an air jet in cross-flow. An air jet in cross-flow is representative of a complex interaction and results in combustor liner distress (i.e., oxidation) local to dilution and trim holes. This occurs for several reasons. The presence of this jet disturbs the approaching flow along the walls of the liner and pressure gradients within the combustor, and promotes the formation of secondary flow or vortical structures. These secondary flows and vortical structures disrupt (and reduce) the cooling in the vicinity of the combustor liners by mixing with the cooling air and driving hot gases from the combustion process to the liner surfaces. Since this mixture is undergoing combustion, it can exceed the melting point of the combustor liner materials. In addition, the air jets provide a blockage for the approaching flow. This means that the flows need to accelerate around the dilution holes increasing the heat transfer and the strength of the local secondary flows. Moreover, the jet in cross-flow creates a wake that promotes a downwash of hot gases around the holes. The interaction with the approaching flow may not be uniform given swirl and non-homogeneous fuel-air distributions produced by the forward fuels nozzles, air swirlers, cooling air and air introduction. This can create a biased distress pattern on the combustor liner.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a liner associated with a combustor of an aircraft engine, comprising: a thermal barrier coating, and a base metal, wherein the thermal barrier coating comprises a contoured surface on a flowpath side proximate to an exit of a hole formed by the thermal barrier coating and the base metal. In some embodiments, a panel is coupled to a shell to form the liner. In some embodiments, the contoured surface is formed based on the base metal having a first thickness adjacent to the hole and a second thickness further from the hole. In some embodiments, the contoured surface is formed based on a first thickness in proximity to the hole and a second thickness distant from the hole, where the first thickness defines a maximum thickness of the liner in a contour region, the second thickness defines a base thickness of the liner and the contour region is a geometric shape between the first and second thicknesses. In some embodiments, the base metal includes a planar surface that is adjacent to the thermal barrier coating, and the contoured surface is formed based on the thermal barrier coating have a first thickness adjacent to the hole and a second thickness further from the hole. In some embodiments, the thermal barrier coating comprises a top coat and a bond coat. In some embodiments, the contoured surface is formed based on the bond coat having a first thickness adjacent to the hole and a second thickness further from the hole. In some embodiments, the contoured surface is formed based on the top coat having a first thickness adjacent to the hole and a second thickness further from the hole. In some embodiments, the hole is one of an air feed hole, a dilution hole, or a trim hole. In some embodiments, the liner further comprises a grommet that is formed by a surface of the base metal and a shell. In some embodiments, the grommet is integral with a panel. In some embodiments, the contoured surface is formed during a casting or fabrication of a panel. In some embodiments, the contoured surface includes a transition of at least 0.25 millimeters. In some embodiments, the contoured surface is formed based on material that is added to at least one of the thermal barrier coating or the base metal, and the material is added in substantially equal amounts to a forward side and an aft side of the hole. In some embodiments, the contoured surface is formed based on material that is added to at least one of the thermal barrier coating or the base metal, and the material is added in substantially unequal amounts to a forward side and an aft side of the hole. In some embodiments, the contoured surface is formed based on material that is added in a three-dimensional pattern about the hole to create a three-dimensional contoured surface.

Aspects of the disclosure are directed to a method for forming a liner of a combustor of an aircraft engine, the method comprising: providing a base metal, and coupling a thermal barrier coating to the base metal, wherein the thermal barrier coating comprises a contoured surface on a flowpath side proximate to an exit of a hole formed by the thermal barrier coating and the base metal. In some embodiments, the hole is one or a dilution hole or an air feed hole.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for using passive techniques to control or manipulate a flow field in proximity to one or more holes (e.g., air feed, dilution, or trim holes). Aspects of the disclosure include an addition of a protruding surface (or bump-out) and/or a contoured surface on a(n interior) flowpath side of a combustor panel around, or in proximity to (e.g., within a threshold distance of), the exit of a hole on a combustor panel. This impacts the complex flow produced by an air jet in cross-flow, specifically those having the potential to cause panel distress. The bump-out may be uniform around a dilution hole in some embodiments. In other embodiments, the bump-out may be non-uniform or biased around portions of the hole and an adjacent panel area, or form a contoured surface in the vicinity of the hole. In some embodiments, this bump-out is created during a casting or a fabrication of the panel. The coatings applied to the panel may be used to create the bump-out. A thickness of one or more materials or layers may be varied in order to create the bump-out.

Figure 1A:
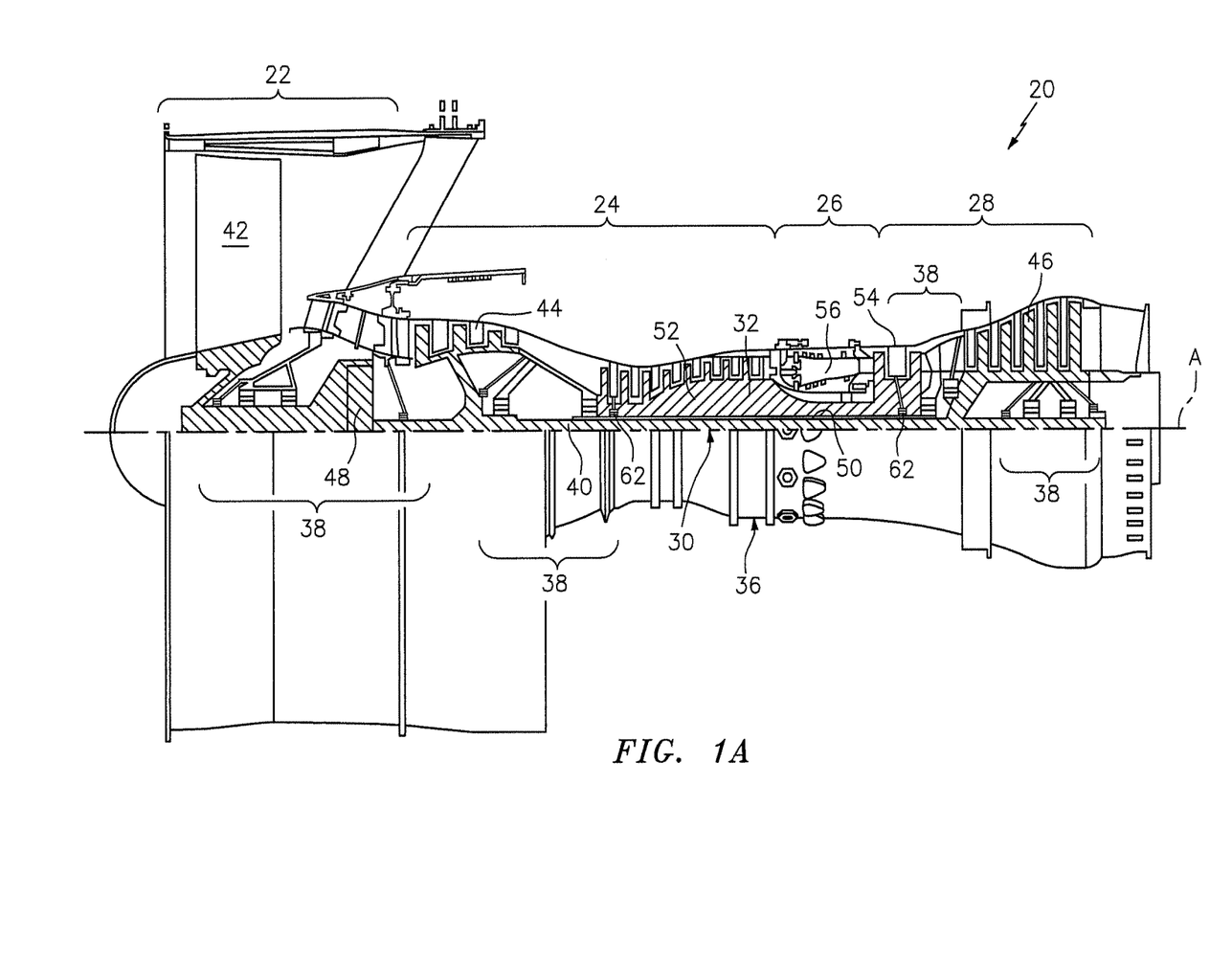
FIG. 1A is a schematic cross-section of an exemplary gas turbine engine.

FIG. 1A schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a LPC 44 of the compressor section 24 and a LPT 46 of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a HPC 52 of the compressor section 24 and HPT 54 of the turbine section 28. A combustor 56 is arranged between the HPC 52 and the HPT 54. The inner shaft 40 and the outer shaft 50 are concentric and rotate about the engine central longitudinal axis A that is collinear with their longitudinal axes. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by a bypass flowpath due to the high bypass ratio. The fan section 22 is designed for a particular flight condition—typically cruise at about 0.8 Mach and about 35,000 feet (10,668 meters). This flight condition, with the gas turbine engine 20 at its best fuel consumption, is also known as Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane System. The low Fan Pressure Ratio according to one, non-limiting, embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1,150 feet per second (351 meters per second).

Figure 1B:
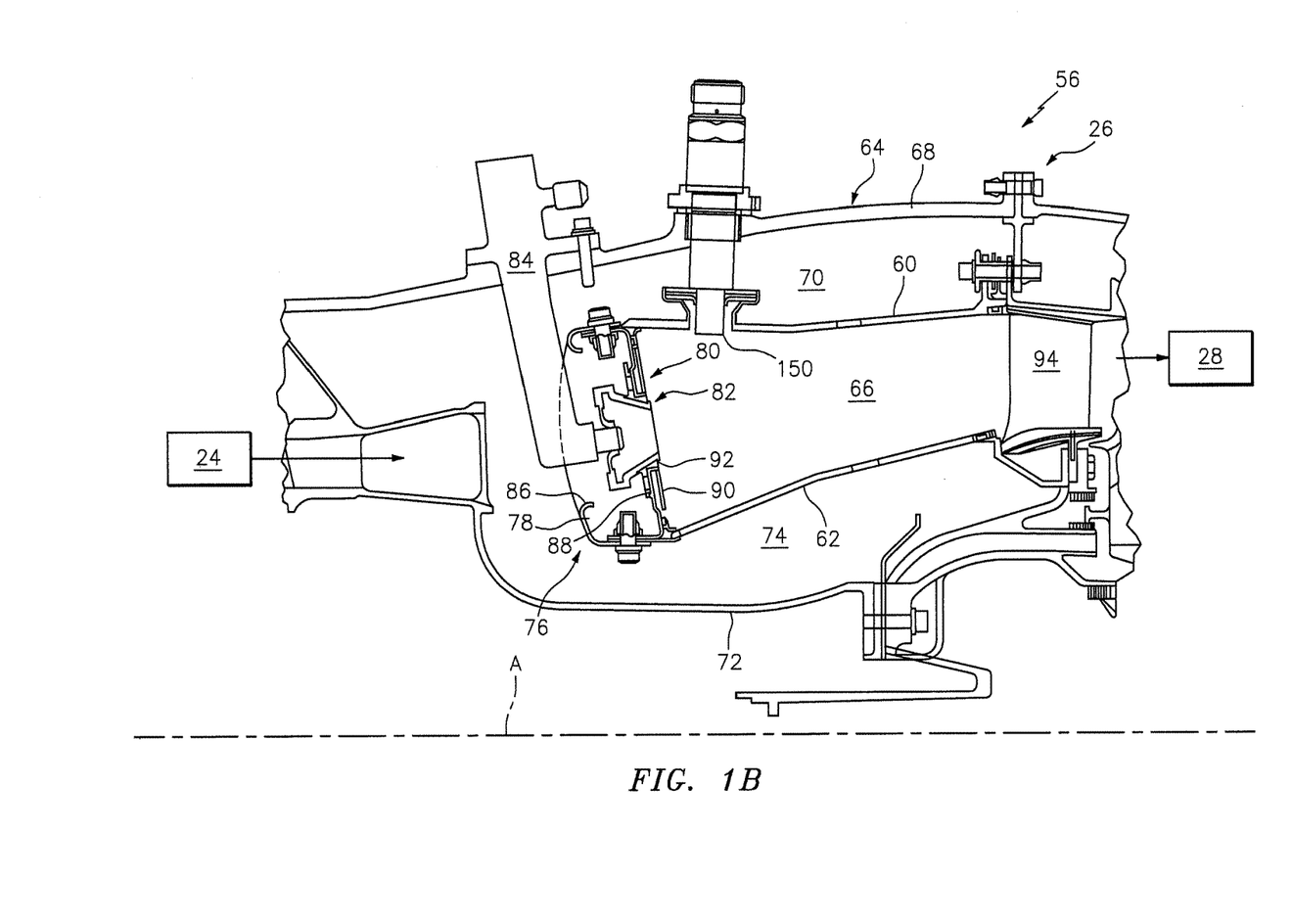
FIG. 1B is a partial cross-section of a combustor of the engine of FIG. 1A.

With reference to FIG. 1B, the combustor 56 may be a single-walled combustor with a multi-layered outer wall 60, a multi-layered inner wall 62, and a diffuser case module 64 that encases walls 60, 62. The outer wall 60 and the inner wall 62 are radially spaced apart such that an annular combustion chamber 66 is formed therebetween. The outer wall 60 is spaced radially inward from an outer diffuser case 68 of the diffuser case module 64 to define an outer annular plenum 70. The inner wall 62 is spaced radially outward from an inner diffuser case 72 of the diffuser case module 64 to define an inner annular plenum 74. The term "single-walled combustor" reflects the difference between traditional combustors that utilize a dual-walled orientation with the inner and outer walls each having a shell spaced from a liner. It should be understood that although a particular combustor is illustrated, other combustor types with various combustor wall arrangements will also benefit. It should be further understood that the disclosed cooling flowpaths are but an illustrated embodiment and should not be limited.

The combustion chamber 66 contains the combustion products that flow axially toward the turbine section 28. Each combustor wall 60, 62 may be generally cylindrical and extend circumferentially about the engine axis. The walls 60, 62 may each be a single panel or formed utilizing a plurality of panels. The panel(s) may be circumferentially continuous (e.g., ring shaped) and divided axially, may be divided circumferentially from each, or both (e.g., substantially rectilinear in shape).

The combustor 56 further includes a forward assembly 76 immediately downstream of the compressor section 24 to receive compressed airflow therefrom. The forward assembly 76 generally includes an annular hood 78, a bulkhead assembly 80, and a plurality of swirlers 82 (one shown). Each of the swirlers 82 is circumferentially aligned with one of a plurality of fuel nozzles 84 (one shown) and a respective one of a plurality of hood ports 86. The bulkhead assembly 80 includes a bulkhead support shell 88 secured to the combustor walls 60, 62, and a plurality of circumferentially distributed bulkhead heat shields or panels 90 secured to the bulkhead support shell 88 around each of a respective swirler opening 92. The bulkhead support shell 88 is generally annular and the plurality of circumferentially distributed bulkhead panels 90 are segmented, typically one to each fuel nozzle 84 and swirler 82. It is further contemplated and understood that the heat shield(s) 90 and support shell(s) 88 may be replaced with a multi-layered, single, wall similar to the walls 60, 62.

The annular hood 78 extends radially between, and may be secured to, the forwardmost ends of the combustor walls 60, 62. Each one of the plurality of circumferentially distributed hood ports 86 receives a respective one of the plurality of fuel nozzles 84 and facilitates the direction of compressed air into the forward end of the combustion chamber 66 through the swirler opening 92. Each fuel nozzle 84 may be secured to the diffuser case module 64 and projects through one of the hood ports 86 into the respective swirler opening 92.

The forward assembly 76 introduces core combustion air into the forward section of the combustion chamber 66 while the remainder enters the outer annular plenum 70 and the inner annular plenum 74. The plurality of fuel nozzles 84 and adjacent structure generate a blended fuel-air mixture that supports stable combustion in the combustion chamber 66.

Opposite the forward assembly 76, the outer and inner walls 60, 62 may be mounted adjacent to a first row of Nozzle Guide Vanes (NGVs) 94 in the HPT 54. The NGVs 94 are static engine components that direct core airflow combustion gases onto the turbine blades of the first turbine rotor in the turbine section 28 to facilitate the conversion of pressure energy into kinetic energy. The core airflow combustion gases are also accelerated by the NGVs 94 because of their convergent shape and are typically given a "spin" or a "swirl" in the direction of turbine rotor rotation. The turbine rotor blades absorb this energy to drive the turbine rotor at high speed.

Figure 2:
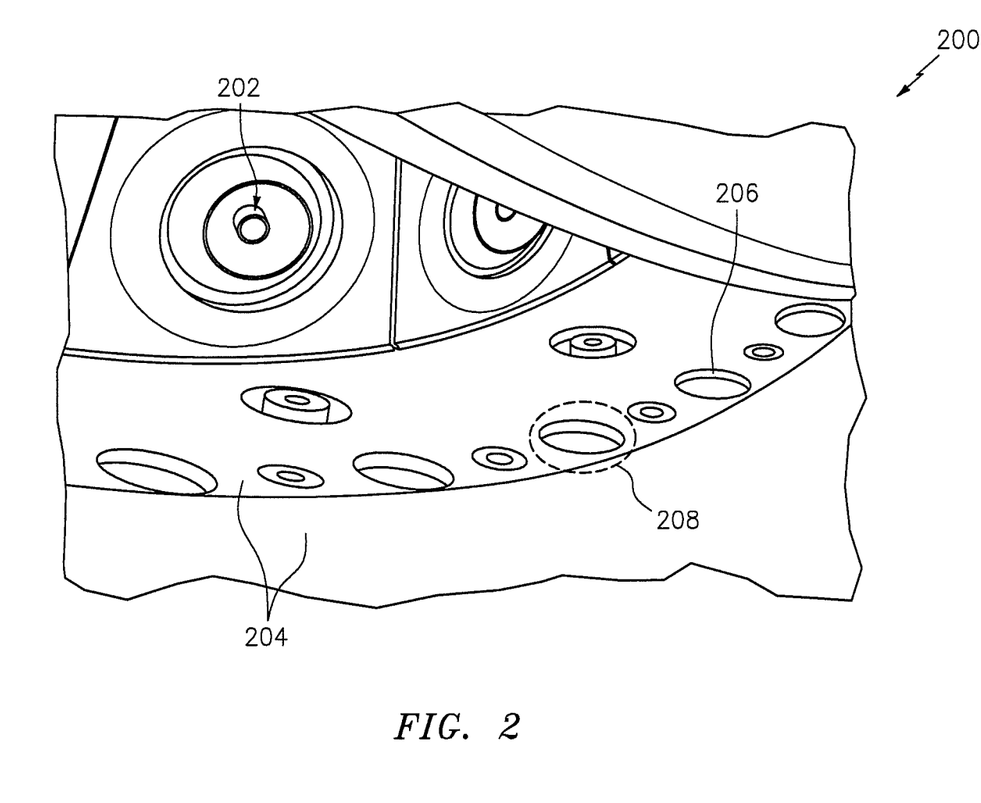
FIG. 2 illustrates a portion of a combustor interface associated with the engine of FIG. 1A.

Referring to FIG. 2, an interface 200 to the engine 20 of FIG. 1A is shown. The interface 200 includes a swirler and fuel nozzle 202 that may be used to supply a mixture of air and fuel to the combustion chamber 66 for combustion. One or more combustor panels 204 may provide a casing or enclosure for the engine 20, where the panels 204 may correspond to, or be associated with, one or both of the walls 60 and 62 of FIG. 1B. Dilution/trim holes 206 may supply air for regulating/maintaining the combustion. Due to high temperatures as well as a relatively large mass of material (e.g., grommet) around the holes 206, the panels 204 may be distressed in the proximity of the holes 206 as shown via reference character 208. Such distress 208 may take the foul' of, or include, oxidation or melting. Aspects of the disclosure may be directed to minimizing/reducing the extent or level of the distress 208.

Figure 3:
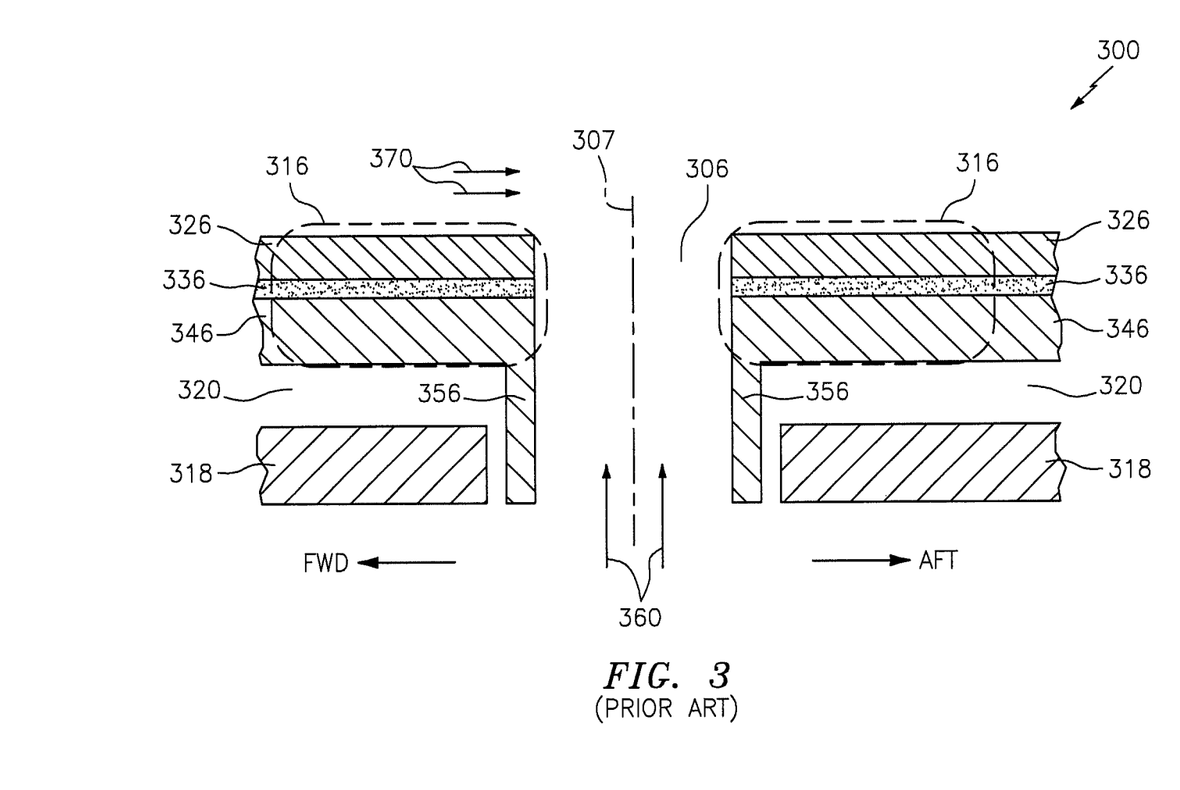
FIG. 3 illustrates a portion of a combustor interface associated with an engine in accordance with the prior art.

Referring to FIG. 3, a system environment 300 is shown. In particular, the system 300 represents an interface associated with an engine. The system 300 includes a hole 306, the center of which is shown as a dashed line 307 in FIG. 3. The hole 306 may correspond to one or more of the holes 206 described above in connection with FIG. 2.

Located around the circumference of the hole 306 is a stack-up of a panel 316 (denoted by the dashed circles in FIG. 3) and a shell 318, denoted by a first or forward (FWD) side and a second or aft (AFT) side. The panel 316 and the shell 318 form a liner of a combustor. The panel 316 interfaces/couples to the shell 318 via a panel-shell gap 320. The gap 320 may denote the absence of material and may include air.

The panel 316 is composed of a top coat 326, a bond coat 336, and a base metal 346. The top coat 326 and the bond coat 336 form a thermal/environmental barrier coating. The base metal 346 is selected to accommodate elevated temperatures and is frequently made of nickel or a nickel alloy.

A grommet 356 is frequently included. The grommet 356 is integral with the panel 316 or is added-on to the panel 316. The grommet 356 may be formed by surfaces of one or more of the base metal 346, the panel 316, and the shell 318.

Superimposed in FIG. 3 are arrows 360 and 370 representative of air flows. In particular, arrows 360 are representative of an air flow provided by a diffuser plenum feed. Arrows 370 are representative of an air flow associated with a cooling boundary layer and may be indicative of a cross jet that contributes to a secondary flow or vortices as described above.

As shown in the FIG. 3, the top coat 326, the bond coat 336, and the (majority of the) base metal 346 may be substantially uniform in terms of thickness and oriented substantially perpendicular to the direction of the arrow/air flow 360/hole 306.

Figure 4:
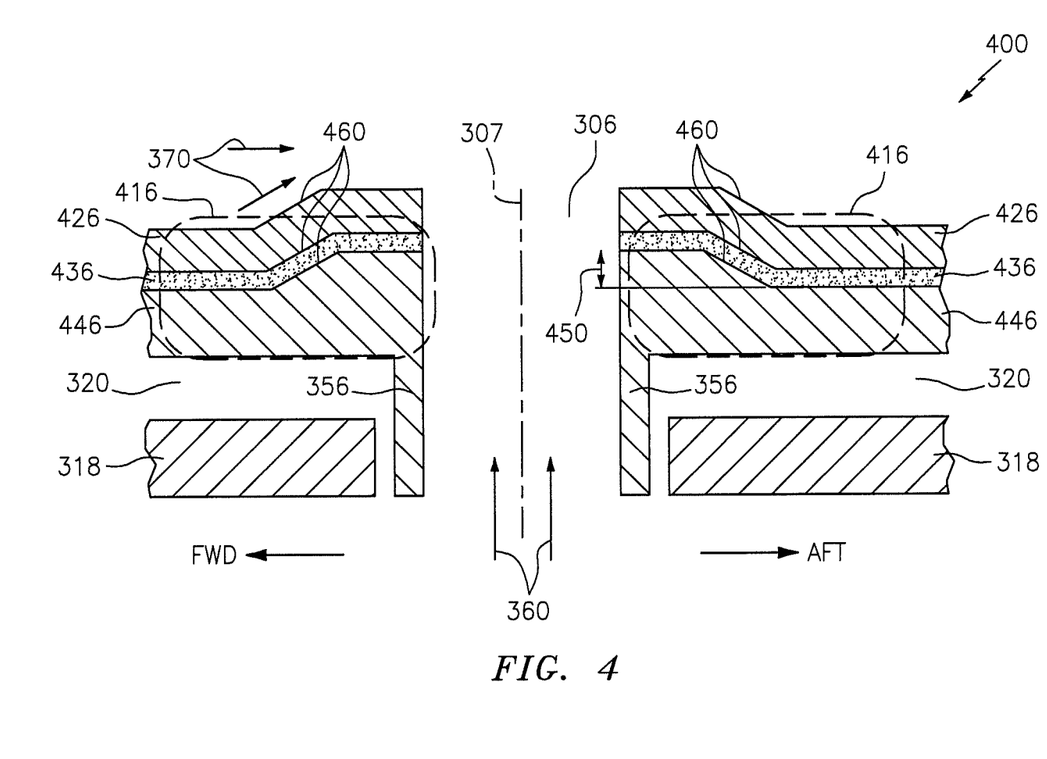
FIG. 4 illustrates a portion of a combustor interface associated with an engine in accordance with aspects of this disclosure.
Figure 5:
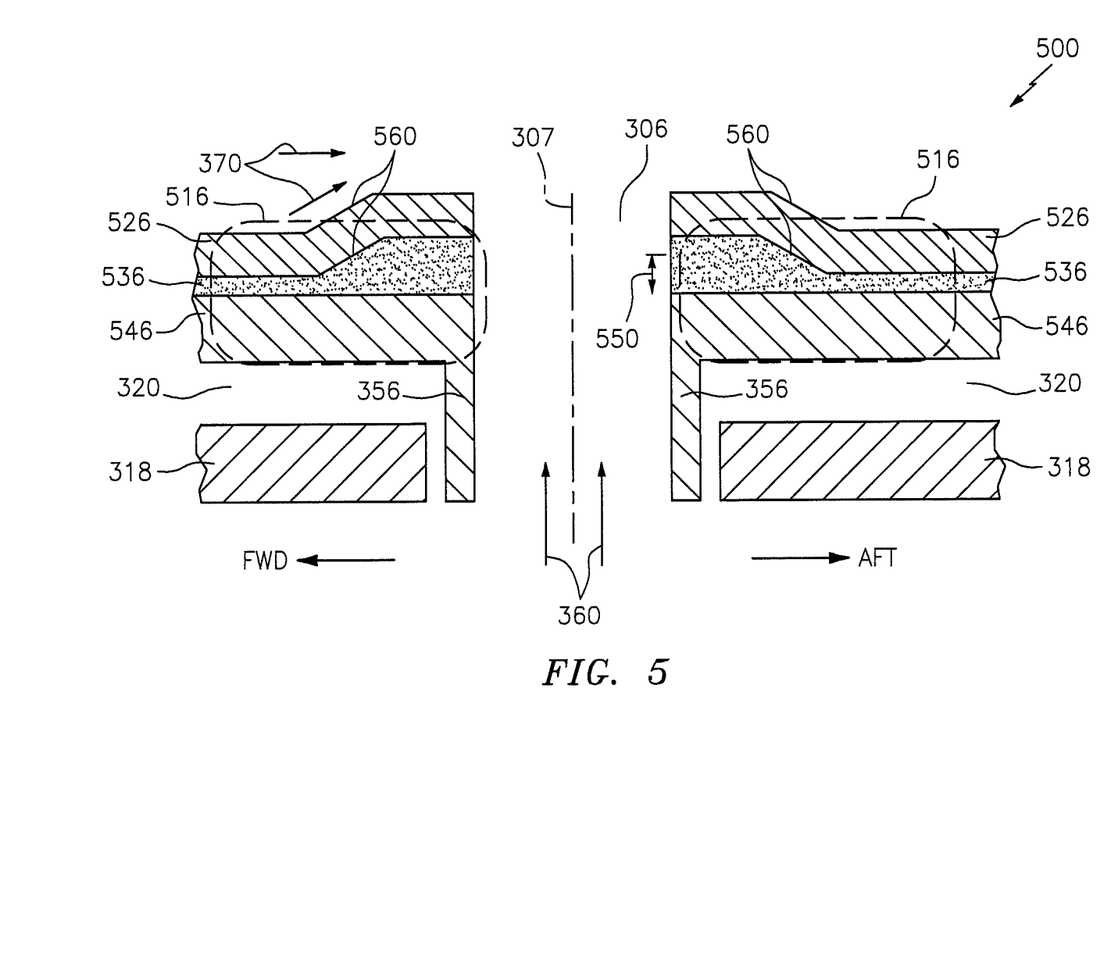
FIG. 5 illustrates a portion of an interface associated with an engine in accordance with aspects of this disclosure.

In order to improve or maximize the flow field in the vicinity of the hole 306, aspects of the disclosure are directed to a provisioning of a protruding surface or bumpout and/or a contoured surface on a flowpath side of the panel 316. FIGS. 4-5 illustrate exemplary system environments 400 and 500 that incorporate such features. The systems 400 and 500 incorporate some of the features described above in connection with the system 300, and so, a complete re-description of such features is omitted herein for the sake of brevity.

In FIG. 4, a panel 416 is shown. The panel 416 is composed of a top coat 426, a bond coat 436, and a base metal 446. The top coat 426 and the bond coat 436 may have a dimension or thickness that is similar to the top coat 326 and the bond coat 336. However, the base metal 446 may include additional material relative to the base metal 346, such that the panel 416 may be thicker than the panel 316 in an amount represented by the arrow 450 (or analogously, the contoured surface on the flowpath side of the panel 416). In some embodiments, the additional thickness 450 may be at least ten-thousandths of an inch (0.010") (or approximately 0.25 millimeters). The additional thickness 450 may be reflected by a transition region 460 in the top coat 426, the bond coat 436, and the base metal 446.

In FIG. 5, a panel 516 is shown. The panel 516 is composed of a top coat 526, a bond coat 536, and a base metal 546. The base metal 546 may have a dimension or thickness that is similar to the base metal 346. The base metal 546 includes a substantially planar surface that is adjacent to the thermal barrier coating (formed by the top coat 526 and the bond coat 536). The bond coat 536 may include additional material relative to the bond coat 336, such that the panel 516 may be thicker than the panel 316 in an amount represented by the arrow 550 (or analogously, the contoured surface on the flowpath side of the panel 516). In some embodiments, the additional thickness 550 may be at least ten-thousandths of an inch (0.010") (or approximately 0.25 millimeters). The additional thickness 550 may be reflected by a transition region 560 in the top coat 526 and the bond coat 536.

In some embodiments, the additional material may be provided to the top coat 526 in addition to, or in lieu of, providing the additional material in the bond coat 536 as shown in FIG. 5.

In view of FIGS. 4-5, one or more of a base metal, a bond coat, or a top coat may have a first thickness adjacent to a hole and a second thickness further from the hole. The first thickness may be of a greater size/dimension relative to the second thickness. A transition region may bridge the first and second thicknesses.

While the system environments 400 and 500 are shown as having a substantially symmetric/equal thickness 450 and 550 added to the FWD and AFT sides, in some embodiments the thickness that is added may be substantially asymmetric/unequal between the FWD and AFT sides of the hole 306.

While some of the examples, described herein related to a panel (e.g., a combustor panel), aspects of the disclosure may be applied to other entities, such as liner walls.

Technical effects and benefits of this disclosure include a cost-effective design for controlling and managing a flow field. In some embodiments, a protruding surface or contoured surface may be used to provide for such control and management in a passive manner.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A liner associated with a combustor of an aircraft engine, comprising:
   a panel composed of a thermal barrier coating and a base metal; and
   a shell coupled to the panel;
   wherein the thermal barrier coating comprises a contoured surface on a combustion flowpath side proximate to an exit of a hole defined by the thermal barrier coating and the base metal;
   wherein the contoured surface is defined by the base metal having a first material thickness adjacent to the hole and a second material thickness further from the hole;
   wherein the contoured surface is defined by a ramp between the first thickness and the second thickness;
   wherein the first thickness is greater than the second thickness; and
   wherein the ramp projects away from the shell in transitioning from the second thickness to the first thickness.

2. The liner of claim 1, wherein the first thickness defines a maximum thickness of the liner in a contour region and the second thickness defines a base thickness of the liner.

3. The liner of claim 1, wherein the contoured surface is defined by the thermal barrier coating have a first thickness adjacent to the hole and a second thickness further from the hole.

4. The liner of claim 1, wherein the thermal barrier coating comprises a top coat and a bond coat.

5. The liner of claim 4, wherein the contoured surface is defined by the bond coat having a first thickness adjacent to the hole and a second thickness further from the hole.

6. The liner of claim 4, wherein the contoured surface is defined by the top coat having a first thickness adjacent to the hole and a second thickness further from the hole.

7. The liner of claim 1, wherein the hole is one of an air feed hole, a dilution hole, or a trim hole.

8. The liner of claim 1, further comprising:
   a grommet that is defined by a surface of the base metal and a shell.

9. The liner of claim 8, wherein the grommet is integral with a panel.

10. The liner of claim 1, wherein the contoured surface is formed during a casting or fabrication of a panel.

11. The liner of claim 1, wherein the contoured surface includes a transition of 0.25 millimeters.

12. The liner of claim 1, wherein the contoured surface is defined by a material that is present in substantially equal amounts relative to a first side and a second side of the hole.

13. The liner of claim 1, wherein the contoured surface is defined by material that is included in a three-dimensional pattern about the hole to provide a three-dimensional contoured surface.

14. A method for forming a liner of a combustor of an aircraft engine, the method comprising:
   providing a base metal;
   coupling a thermal barrier coating to the base metal, wherein the base metal and the thermal barrier coating are included in a panel; and
   coupling the panel to a shell;
   wherein the thermal barrier coating comprises a contoured surface on a combustion flowpath side proximate to an exit of a hole formed by the thermal barrier coating and the base metal;
   wherein the contoured surface is defined by the base metal having a first material thickness adjacent to the hole and a second material thickness further from the hole;
   wherein the contoured surface is defined by a ramp between the first thickness and the second thickness;
   wherein the first thickness is greater than the second thickness; and
   wherein the ramp projects away from the shell in transitioning from the second thickness to the first thickness.

15. The method of claim 14, wherein the hole is one of a dilution hole or an air feed hole.

* * * * *

UNITED STATES PATENT AND TRADEMARK OFFICE
CERTIFICATE OF CORRECTION

PATENT NO. : 10,132,498 B2
APPLICATION NO. : 14/601037
DATED : November 20, 2018
INVENTOR(S) : Steven W. Burd It is certified that error appears in the above-identified patent and that said Letters Patent is hereby corrected as shown below:

In the Specification

Column 5, Line 67, please delete "foul" and insert --form--.

Signed and Sealed this
Twenty-second Day of January, 2019

Andrei Iancu
*Director of the United States Patent and Trademark Office*